US012679745B2

(12) United States Patent
Kumakura et al.

(10) Patent No.: US 12,679,745 B2
(45) Date of Patent: Jul. 14, 2026

(54) METHOD FOR PREPARING A POSITIVE ELECTRODE ACTIVE MATERIAL FOR RECHARGEABLE BATTERIES

(71) Applicant: UMICORE, Brussels (BE)

(72) Inventors: Shinichi Kumakura, Olen (BE); Taehyeon Yang, Chungcheongnam-do (KR)

(73) Assignee: UMICORE, Brussels (BE)

( * ) Notice: Subject to any disclaimer, the term of this patent is extended or adjusted under 35 U.S.C. 154(b) by 594 days.

(21) Appl. No.: 18/265,587

(22) PCT Filed: Dec. 17, 2021

(86) PCT No.: PCT/IB2021/061912
§ 371 (c)(1),
(2) Date: Jun. 6, 2023

(87) PCT Pub. No.: WO2022/130312
PCT Pub. Date: Jun. 23, 2022

(65) Prior Publication Data
US 2024/0030425 A1 Jan. 25, 2024

(30) Foreign Application Priority Data

Dec. 18, 2020 (EP) ..................................... 20215465
Dec. 18, 2020 (EP) ..................................... 20215473

(51) Int. Cl.
*H01M 4/505* (2010.01)
*C01G 41/00* (2006.01)
(Continued)

(52) U.S. Cl.
CPC ............ *H01M 4/505* (2013.01); *C01G 41/00* (2013.01); *C01G 53/44* (2013.01); *H01M 4/366* (2013.01);
(Continued)

(58) Field of Classification Search
CPC ...... H01M 4/505; H01M 4/366; H01M 4/525; H01M 2004/021; H01M 2004/028;
(Continued)

(56) References Cited

U.S. PATENT DOCUMENTS

2008/0044736 A1 2/2008 Nakura
2012/0301786 A1 11/2012 Takamuku et al.
(Continued)

FOREIGN PATENT DOCUMENTS

CN 106058217 A 10/2016
JP 2006351379 A 12/2006
(Continued)

OTHER PUBLICATIONS

JPO: Notice of Reasons for Rejection for corresponding Japanese Patent Application No. 2023-537158, mailed Jul. 29, 2024, 4 pages.
(Continued)

*Primary Examiner* — Helen Oi K Conley
(74) *Attorney, Agent, or Firm* — Rimon P.C.; Allyn B. Elliott

(57) ABSTRACT

Method for manufacturing positive electrode active material for batteries comprising Li, O and M, wherein M consists of:
—Co between 5 and 35 mol %; —Mn less than 35 mol %; —A less than 10 mol %, A being an element from: B, Mg, Al, Nb, Ti, W, Y, Ca, S, P, Zr, Sn, Si and W, and —The balance Ni, Which comprises: Step 1: preparing a liquid slurry of a lithium mixed metal oxide powder, Step 2: mixing the powder before or after or during step 1 with a cation selected from: $Al^{3+}$, $La^{3+}$, $Co^{2+}$, $Co^{3+}$, $Mn^{2+}$, $Mn^{3+}$, $Mn^{4+}$, $Mn^{6+}$, $Zn^{2+}$, $Cu^+$, $Cu^{2+}$, $B^{3+}$, $Mg^{2+}$, and with an anion having a general formula $A'_yO_z^{-x'}$, wherein A' is: B, Al, Sn, Si, P, W, wherein $0.5 \leq x \leq 4$, $0.5 \leq y' \leq 2$ and $1 \leq z' \leq 12$; Step 3: drying said slurry; Step 4: heating the slurry resulting from steps 1 and 2 or the dried slurry from step 3.

25 Claims, 4 Drawing Sheets

(51) Int. Cl.

| | |
|---|---|
| *C01G 53/44* | (2025.01) |
| *H01M 4/02* | (2006.01) |
| *H01M 4/36* | (2006.01) |
| *H01M 4/525* | (2010.01) |

(52) U.S. Cl.
CPC ......... *H01M 4/525* (2013.01); *C01P 2002/50* (2013.01); *C01P 2002/72* (2013.01); *C01P 2002/85* (2013.01); *C01P 2004/03* (2013.01); *C01P 2004/04* (2013.01); *C01P 2004/51* (2013.01); *C01P 2004/61* (2013.01); *C01P 2004/62* (2013.01); *C01P 2006/40* (2013.01); *H01M 2004/021* (2013.01); *H01M 2004/028* (2013.01)

(58) Field of Classification Search
CPC ......... H01M 10/0525; H01M 10/0565; H01M 2300/0082; C01G 41/00; C01G 53/44; C01G 53/50; C01P 2002/50; C01P 2002/72; C01P 2002/85; C01P 2004/03; C01P 2004/04; C01P 2004/51; C01P 2004/61; C01P 2004/62; C01P 2006/40; C01P 2002/52; C01P 2002/54; Y02E 60/10

See application file for complete search history.

(56) References Cited

U.S. PATENT DOCUMENTS

| | | | |
|---|---|---|---|
| 2018/0108940 A1 | 4/2018 | Kwon et al. |
| 2018/0261842 A1 | 9/2018 | Park et al. |
| 2018/0287135 A1 | 10/2018 | Shin et al. |
| 2020/0058938 A1 | 2/2020 | Kondo et al. |
| 2020/0266438 A1 | 8/2020 | Han et al. |

FOREIGN PATENT DOCUMENTS

| | | | |
|---|---|---|---|
| JP | 2013125732 A | 6/2013 |
| JP | 2018515884 A | 6/2018 |
| JP | 2018532236 A | 11/2018 |
| JP | 2018534734 A | 11/2018 |
| JP | 2020129499 A | 8/2020 |
| KR | 20190058360 A | 5/2019 |
| KR | 20190078991 A | 7/2019 |

OTHER PUBLICATIONS

ISA/EP; International Search Report and Written Opinion for International Patent Application No. PCT/IB2021/061912 dated Apr. 8, 2022, 10 pages.
Korean Intellectual Property Office: Office Action issued in corresponding Korean Patent Application No. 10-2023-7024336, mailed Sep. 5, 2025, with English Translation, 19 pages.

METHOD FOR PREPARING A POSITIVE ELECTRODE ACTIVE MATERIAL FOR RECHARGEABLE BATTERIES

CROSS-REFERENCE TO RELATED APPLICATIONS

This application is a U.S. National Stage application of International Patent Application No. PCT/IB2021/061912, filed on Dec. 17, 2021, which claims the benefit of European Patent Application No. 20215465.4, filed on Dec. 18, 2020, and European Patent Application No. 20215473.8, filed on Dec. 18, 2020.

TECHNICAL FIELD

The present invention relates to a method for manufacturing a positive electrode active material for solid-state rechargeable batteries (SSBs).

INTRODUCTION

SSBs typically include a negative electrode (anode), an electrolyte, and a positive electrode (cathode) that contains lithium in the form of a lithium-transition metal oxide. Particularly noteworthy classes of transition metal oxides include nickel-manganese-cobalt (NMC) oxides and nickel-cobalt-aluminium (NCA) oxides. The applicability of these materials, however, is limited because of their limited capacity retention after repeated charge-discharge cycles at higher temperatures and higher voltages.

Therefore, new materials have been developed containing small amounts of Li—W-compounds.

The present invention aims to provide a method for manufacturing a positive electrode active material having improved stability and electrochemical properties, such as a lower capacity leakage ($Q_{total}$) at a high voltage and high temperature, in particular a $Q_{total}$ of inferior to 55 mAh/g at a temperature of 80° C. evaluated according to the testing method specified below.

SUMMARY

The current invention provides in a solution for at least one of the above mentioned problems by providing a method for manufacturing a positive electrode active material for SSBs, in particular a method for manufacturing a positive electrode active material for solid-state rechargeable batteries comprising Li, O and M, wherein M consists of:

Co in a content x superior or equal to 0 mol % and inferior or equal to 35.00 mol %, Mn in a content y superior or equal to 0 mol % and inferior or equal to 35.00 mol %, A in a content z superior or equal to 0 mol % and inferior or equal to 10.00 mol %, whereby A is at least one element selected from: B, Mg, Al, Nb, Ti, W, Y, Ca, S, P, Sn, Si and Zr, and Ni in a content of 100.00 mol %-x-y-z, whereby the contents x, y, and z are contents relative to M and are as determined by ICP.

The inventors have found that positive electrode active materials prepared by the method according to the present invention show a lower capacity leakage ($Q_{total}$).

BRIEF DESCRIPTION OF THE FIGURES

By means of further guidance, figures are included to better appreciate the teaching of the present invention. Said figures are intended to assist the description of the invention and are nowhere intended as a limitation of the presently disclosed invention.

The figures and symbols contained therein have the meaning as commonly understood by one of ordinary skill in the art to which this invention belongs.

DETAILED DESCRIPTION OF THE INVENTION

Figure 1A:
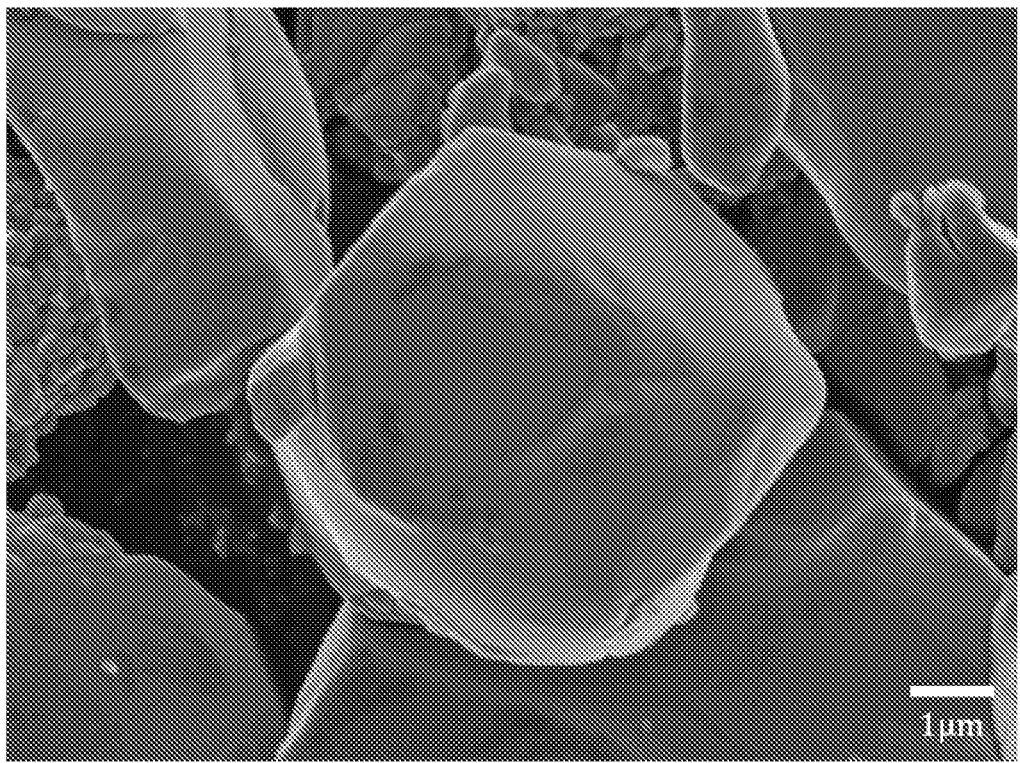
FIG. 1A depicts a SEM image of particles having a formula $Li_{1.01}(Ni_{0.63}Mn_{0.22}Co_{0.15})_{0.99}O_2$

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The recitation of numerical ranges by endpoints includes all numbers and fractions subsumed within that range, as well as the recited endpoints. All percentages are to be understood as percentage by weight, abbreviated as "wt. %", unless otherwise defined or unless a different meaning is obvious to the person skilled in the art from its use and in the context wherein it is used.

Where an element or component is stated to be present in a content superior or equal to 0% or ≥0, this shall mean that the presence of this element or component is optional.

In a first aspect, the present invention provides a method for manufacturing a positive electrode active material for solid-state rechargeable batteries, whereby the active material comprises Li, O and M, wherein M consists of Co in a content x superior or equal to 0 mol % and inferior or equal to 35.00 mol %, Mn in a content y superior or equal to 0 mol % and inferior or equal to 35.00 mol %, A in a content z superior or equal to 0 mol % and inferior or equal to 10.00 mol %, whereby A is at least one element selected from: B, Mg, Al, Nb, Ti, W, Y, Ca, S, P, Sn, Si and Zr, and Ni in a content of 100.00 mol %-x-y-z, whereby the contents x, y, and z are contents relative to M and are as determined by ICP, whereby the method comprises the following steps:

Step 1: preparing a slurry, whereby the slurry comprises a liquid and a lithium mixed metal oxide powder, whereby the lithium mixed metal oxide powder comprises Li, O and Q, wherein Q consists of: Co in a content a superior or equal to 0 mol % and inferior or equal to 35.00 mol %, Mn in a content b superior or equal to 0 mol % and inferior or equal to 35.00 mol %, G in a content c superior or equal to 0 mol % and inferior or equal to 10.00 mol %, whereby G is at least one element selected from: B, Mg, Al, Nb, Ti, W, Y, Ca, S, P, Sn, Si and Zr; and Ni in a content of 100.00 mol %-a-b-c, whereby the contents a, b, and c are contents relative to M and are as determined by ICP;

Step 2: mixing said lithium mixed metal oxide powder, before and/or after and/or during step 1, with a cation precursor comprising at least one cation selected from: $Al^{3+}$, $La^{3+}$, $Co^{2+}$, $Co^{3+}$, $Mn^{2+}$, $Mn^{3+}$, $Mn^{4+}$, $Mn^{6+}$, $Zn^{2+}$, $Cu^+$, $Cu^{2+}$, $Mg^{2+}$, and with an anion precursor comprising at least one anion having a general formula $A'_{y'}O_{z'}^{-x'}$, wherein A' is selected from: B, Al, Sn, Si, P, W, wherein $0.5 \leq x' \leq 4$, $0.5 \leq y' \leq 2$ and $1 \leq z' \leq 12$;

Step 3: filtering and optionally drying said slurry to obtain a wet or dry solid fraction, whereby step 3 is optional;

Step 4: heating the slurry resulting from steps 1 and 2 or the solid fraction resulting from step 3 at a temperature in the range of 300° C. to 1000° C.

In the context of the present invention, the term "cation precursor" and "anion precursor" should be understood as a compound yielding a cation or anion, respectively, upon dissolution in said liquid. Preferably, said cation precursor and said anion precursor dissolve quantitatively, i.e. more than 99%, upon addition to water. Examples of cation precursors and said anion precursors are shown in Table 1.

In a preferred embodiment the positive electrode active material has a Li/(Ni+Co+Mn) molar ratio superior or equal to 0.90 and inferior or equal to 1.10 and the lithium mixed metal oxide powder has a Li/(Ni+Co+Mn) molar ratio superior or equal to 0.90 and inferior or equal to 1.10;

Preferably said liquid is water.

Such a method allows for an easy introduction of an additional phase, which improves the $Q_{total}$ of the obtained positive electrode active material.

Preferably, but not necessarily, step 3 is present.

In a preferred embodiment the temperature in step 4 is between 350° C. and 1000° C., and preferably between 350° C. and 800° C.

In a preferred embodiment x is superior or equal to 2.0 mol % and more preferably superior or equal to 5.0 mol %.

In a preferred embodiment a is superior or equal to 2.0 mol % and more preferably superior or equal to 5.0 mol %.

The inventors have found that a further heat treatment at a temperature above 300° C. results in a reduced $Q_{total}$, indicating a reduced capacity leakage. Preferably, said temperature is higher than 350° C., higher than 400° C. or even higher than 450° C. Preferably, said temperature is lower than 900° C., or even lower than 800° C. Most preferably, said temperature is about 350° C., 400° C., 450° C., 500° C., 550° C., 600° C., 650° C., 700° C. or 750° C., or any temperature there in between. Preferably, the duration of step 4) is 1 hour or more, and more preferably 2 hours or more. Preferably, the duration of step 4) is 24 hours or less and more preferably 12 hours or less.

In a preferred embodiment the lithium mixed metal oxide powder is a single-crystal powder, in other words a plurality of single-crystal particles.

The concept of single-crystalline powders is well known in the technical field of positive electrode active material. It concerns powders having mostly single-crystalline particles. Such powder are a separate class of powders compared to poly-crystalline powders, which are made of particles which are mostly poly-crystalline. The skilled person can easily distinguish such these two classes of powders based on a microscopic image.

Single-crystal particles are also known in the technical field as monolithic particles, one-body particles or and mono-crystalline particles.

Even though a technical definition of a single-crystalline powder is superfluous, as the skilled person can easily recognize such a powder with the help of an SEM, in the context of the present invention, single-crystalline powders may be considered to be defined as powders in which 80% or more of the number of particles are single-crystalline particles. This may be determined on an SEM image having a field of view of at least 45 μm×at least 60 μm (i.e. of at least 2700 μm²), and preferably of: at least 100 μm×100 μm (i.e. of at least 10,000 μm²).

Single-crystalline particles are particles which are individual crystals or which are formed of a less than five, and preferably at most three, primary particles which are themselves individual crystals. This can be observed in proper microscope techniques like Scanning Electron Microscope (SEM) by observing grain boundaries.

For the determination whether particles are single-crystalline particles, grains which have a largest linear dimension, as observed by SEM, which is smaller than 20% of the median particle size D50 of the powder, as determined by laser diffraction, are ignored. This avoids that particles which are in essence single-crystalline, but which may have deposited on them several very small other grains, for instance a poly-crystalline coating, are inadvertently considered as not being a single-crystalline particles.

Preferably, the cathode active material comprise Li, O and Q, wherein Q consists of Co in a content a superior or equal to 5.0 mol % and inferior or equal to 35.00 mol %, Mn in a content b superior or equal to 0 mol % and inferior or equal to 35.00 mol %, G in a content c superior or equal to 0 mol % and inferior or equal to 10.00 mol %, whereby G is at least one element selected from: B, Mg, Al, Nb, Ti, W, Y, Ca, S, P, and Zr and Ni in a content of 100.00 mol %-a-b-c, whereby the contents a, b, and c are contents relative to Q and are as determined by ICP, whereby the lithium mixed metal oxide powder has a Li/(Ni+Co+Mn) molar ratio superior or equal to 0.90 and inferior or equal to 1.10.

Preferably, the positive electrode active material is a powder and has a median particle size of 2 μm to 15 μm, as determined by laser diffraction particle size analysis, more preferably a median particle diameter of 3 μm to 12 μm, and most preferably a median particle diameter of 4 μm, 5 μm, 6 μm, 7 μm, 8 μm, or any value there in between. The median particle size (D50) of the compound is obtained by a laser diffraction particle size analysis. The laser particle size distribution is measured using a Malvern Mastersizer 2000 with Hydro 2000MU wet dispersion accessory, after dispersing the powder in an aqueous medium. In order to improve the dispersion of the powder in the aqueous medium, sufficient ultrasonic irradiation, typically 1 minute for an ultrasonic displacement of 12, and stirring, are applied and an appropriate surfactant is introduced.

Preferably, said cation precursor comprises a sulfate, nitrate, carbonate, hydroxide, oxy-hydroxide, acetate, phosphate, borate of a said cation, and mixtures thereof. More preferably, said cation precursor comprises sulfate and/or nitrate.

Preferably, said anion precursor comprises at least one anion selected from: $AlO_2^-$, $WO_4^{2-}$, $SiO_3^{2-}$, $PO_4^{3-}$, $BO_3^{3-}$, $B(OH)_4^-$, $SnO_3^{2-}$.

Preferably, the present invention provides a method according to the first aspect of the invention, whereby said anion precursor has a general formula $Na_x A'_{y'}O_{z'}$.

Preferably, the present invention provides a method according to the first aspect of the invention, whereby said cation precursor is mixed with said lithium mixed metal oxide powder in an amount of 0.2 mol % to 2.0 mol %, relative to the total amount of lithium, preferably between 0.4 mol % and 1.5 mol %, and more preferably, 0.50 mol %, 0.75 mol %, 1.00 mol %, or any value there in between.

Preferably, the present invention provides a method according to the first aspect of the invention, whereby said anion precursor is mixed with said lithium mixed metal oxide powder in an amount of 0.2 mol % to 2.0 mol %, relative to the total amount of lithium, preferably between 0.4 mol % and 1.5 mol %, and more preferably, 0.50 mol %, 0.75 mol %, 1.00 mol %, or any value there in between.

Preferably, the present invention provides a method according to the first aspect of the invention, whereby said cation and anion precursor are mixed in step 2 in a stoichiometrically equivalent amount.

Preferably, said cation and anion precursor form a water-insoluble salt.

In other words, preferably after steps 1 and 2 a precipitate of said cation and said anion has formed.

Preferably, after addition of cation and anion precursor said slurry is stirred at a temperature between 15° C. and 100° C., more preferably 25° C. and 80° C., and most preferably at a temperature of about 40° C., 50° C., 60° C., 70° C. or any value there in between.

Preferably said slurry is an aqueous slurry.

Preferably, said cation precursor and said anion precursor are soluble in the liquid.

Preferably, whereby the positive electrode active material comprises a phase corresponding to a crystalline salt of a lithium ion and said anion, as determined by XRD.

Preferably, A' is the element W.

Preferably, the cation precursor comprises $Co^{2+}$ and/or $Co^{3+}$.

Preferably, A' is the element W and the positive electrode active material comprises $Li_6W_2O_9$, as determined by XRD.

Preferably $x \leq 15.00$ mol % and $y \leq 1.00$ mol %, whereby A comprises Al, whereby M has content of Al of 1.00 mol % or more.

Preferably, $z \leq 5.00$ mol % and 10.00 mol % $\leq y$.

Preferably, 15.00 mol % $\leq x \leq 30.00$ mol % and 15.00 mol % $\leq y \leq 30.00$ mol % and $z \leq 3.00$ mol %

Preferably, the positive electrode active material powder is a plurality of particles, whereby the particle are single-crystal particles. When determining whether the particles are single-crystal particles, phases containing said anions are left out of the consideration.

In a second aspect, the present invention provides a positive electrode active material for solid-state rechargeable batteries obtained by a method according to the first aspect of the invention. The inventors have found that positive electrode active materials prepared by a method according to the present invention show a lower capacity leakage ($Q_{total}$).

In a third aspect, the present invention provides a positive electrode active material for rechargeable solid-state batteries, whereby the positive electrode active material is a powder, whereby the positive electrode active material has a Co content $Co_A$, a Ni content $Ni_A$, and a Mn content $Mn_A$, whereby $Co_A$, $Ni_A$ and $Mn_A$ are determined by ICP analysis, whereby $Co_A$, $Ni_A$ and $Mn_A$ are expressed as mol %, whereby the positive electrode active material has a value A which is defined as $Co_A/(Co_A+Ni_A+Mn_A)$, whereby the powder, when measured by XPS analysis, shows an average Co fraction $Co_B$, an average Ni fraction $Ni_B$, and an average Mn fraction $Mn_B$, whereby $Co_B$, $N_{iB}$ and $Mn_B$ are expressed as mol %, whereby the positive electrode active material has a value B which is defined as $Co_B/(Co_B+N_{iB}+Mn_B)$, whereby the positive electrode active material comprises a $Li_xW_yO_z$ phase as determined by XRD, whereby $1.0 \leq x \leq 8.0$, $1.0 \leq y \leq 5.0$, $3.0 \leq z \leq 10.0$, whereby the ratio B/A is at least 1.25.

Hereby each of $Co_A$, $Ni_A$, $Mn_A$, $Co_B$, $N_{iB}$, and $Mn_B$ is superior or equal to 0%.

In a preferred embodiment of the third aspect the positive electrode active material is a Li-containing positive electrode active material for Li-ion rechargeable solid-state batteries. In a preferred embodiment of the third aspect the positive electrode active material has a Li content $Li_A$ as determined by ICP and is expressed as molar fraction, whereby $Li_A/(Co_A+Ni_A+Mn_A)$ is at least 0.81 and at most 1.21, whereby preferably $Li_A/(Co_A+Ni_A+Mn_A)$ is higher than 0.95.

In a preferred embodiment of the third aspect said $Li_xW_yO_z$ phase is $Li_6W_2O_9$ as determined by XRD.

In a preferred embodiment of the third aspect said $Li_6W_2O_9$ has a Pm3m crystal structure as determined by XRD.

In a preferred embodiment of the third aspect said $Li_xW_yO_z$ phase is present on the surface of said particles as determined by TEM-EDS, preferably as secondary particles.

In a preferred embodiment of the third aspect the positive electrode active material has a W content which is at least 0.1 mol % of the sum of $Co_A$ and $Ni_A$ and $Mn_A$.

In a preferred embodiment of the third aspect the positive electrode active material has a W content which is at most 2.0 mol % of the sum of $Co_A$ and $Ni_A$ and $Mn_A$, and preferably at most 1.0 mol % of the sum of $Co_A$ and $Ni_A$ and $Mn_A$.

In a preferred embodiment of the third aspect said ratio B/A is at least 1.5, and preferably at least 2.0.

In a preferred embodiment of the third aspect the positive electrode active material is manufacturable or manufactured by a method according to the first aspect of the invention or preferred variants thereof.

In a preferred embodiment of the third aspect said ratio B/A is at most 4.0, and preferably at most 2.5.

In a preferred embodiment of the third aspect the powder is a single-crystalline powder.

In a preferred embodiment of the third aspect $Ni_A/(Co_A+Ni_A+Mn_A)$ is at least 0.35, and preferably at least 0.55.

In a preferred embodiment of the third aspect $Co_A/(Co_A+Ni_A+Mn_A)$ is at least 0.02 and at most 0.40.

In a preferred embodiment of the third aspect said powder has a particle size distribution as determined by laser diffraction, whereby said particle size distribution has a median particle size D50 which is at least 1.0 μm and at most 15 μm.

In a preferred embodiment of the third aspect the positive electrode active material has a content $X_A$ of one or more elements X, whereby X is one or more of B, Mg, Al, Nb, Ti, and Zr, whereby $X_A$ is determined by ICP, whereby $X_A$ is expressed as molar fraction, whereby $Mn_A/(Co_A+Ni_A+Mn_A)$ is at least 0.10 and at most 0.60, whereby $Co_A/(Co_A+Ni_A+Mn_A)$ is at least 0.02 and at most 0.40, whereby $X_A/(Co_A+Ni_A+Mn_A)$ is at most 0.10, whereby $Ni_A/(Co_A+Ni_A+Mn_A)$ is at most 0.88.

EXAMPLES

The following examples are intended to further clarify the present invent ion and are nowhere intended to limit the scope of the present invention. It is noted that examples 1-8 concerns examples of methods according to the invention as defined in claim 1, and example 1 concerns examples of products according to the invention as defined in claim 14.

1. Description of Analysis Method

1.1. SEM (Scanning Electron Microscope) Analysis

The morphology of positive electrode active materials is analysed by a Scanning Electron Microscopy (SEM) technique. The measurement is performed with a JEOL JSM 7100F under a high vacuum environment of $9.6 \times 10^{-5}$ Pa at 25° C.

1.2. Inductively Coupled Plasma

The composition of a positive electrode active material powder is measured by the inductively coupled plasma (ICP) method using an Agilent 720 ICP-OES (Agilent Technologies, https://www.agilent.com/cs/library/brochures/5990-6497EN %20720-725_ICP-OES_LR.pdf). 1 gram of powder sample is dissolved into 50 mL of high purity hydrochloric acid (at least 37 wt. % of HCl with respect to the total weight of solution) in an Erlenmeyer flask. The flask is covered by a watch glass and heated on a hot plate at 380° C. until the powder is completely dissolved. After being cooled to room temperature, the solution from the Erlenmeyer flask is poured into a first 250 mL volumetric flask. Afterwards, the first volumetric flask is filled with deionized water up to the 250 mL mark, followed by a complete homogenization process ($1^{st}$ dilution). An appropriate amount of the solution from the first volumetric flask is taken out by a pipette and transferred into a second 250 mL volumetric flask for the $2^{nd}$ dilution, where the second volumetric flask is filled with an internal standard element and 10% hydrochloric acid up to the 250 mL mark and then homogenized. Finally, this solution is used for ICP measurement.

The results of the ICP measurements are calculated and expressed as a fraction which is the molar content of an element compared to the total molar content of Ni and Co and Mn.

1.3. Coin Cell

1.3.1. Coin Cells Preparation

For the preparation of a positive electrode, a slurry that contains a positive electrode active material powder, a conductor (Super P, Timcal (Imerys Graphite & Carbon), http://www.imerys-graphite-and-carbon.com/wordpress/wp-app/uploads/2018/10/ENSACO-150-210-240-250-260-350-360-G-ENSACO-150-250-P-SUPER-P-SUPER-P-Li-C-NERGY-SUPER-C-45-65-T_V-2.2_-USA-SDS.pdf), a binder (KF #9305, Kureha, https://www.kureha.co.jp/en/business/material/pdf/KFpolymer_BD_en.pdf)—with a formulation of 90:5:5 by weight, and a solvent (NMP, Mitsubishi, https://www.m-chemical.co.jp/en/products/departments/mcc/c4/product/1201005_7922.html), is prepared by using a high-speed homogenizer. The homogenized slurry is spread on one side of an aluminium foil using a doctor blade coater with a 230 μm gap. The slurry-coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard® 2320, Arora, P., & Zhang, Z. (John). (2004). *Battery Separators. Chemical Reviews,* 104(10), 4419-4462) is located between the positive electrode and a piece of lithium foil is used as a negative electrode. 1 M LiPF$_6$ in EC:DMC (1:2 in volume) is used as an electrolyte solution and is dropped between separator and electrodes. Then, the coin cell is completely sealed to prevent leakage of the electrolyte.

1.3.2. Testing Method

Each coin cell is cycled at 25° C. using a Toscat-3100 computer-controlled galvanostatic cycling stations (from Toyo, http://www.toyosystem.com/image/menu3/toscat/TOSCAT-3100.pdf). The coin cell testing procedure uses a 1 C current definition of 160 mA/g in the 4.3-3.0 V/Li metal window range according to Table 1. The initial charge capacity (CQ1) and discharge capacity (DQ1) are measured in constant current mode (CC) at C rate of 0.1 C. The irreversible capacity IRRQ is expressed in % as follows:

$$IRRQ\ (\%)=100*(CQ1-DQ1)/CQ1$$

TABLE 1

| Cycling schedule for coin cell testing. | | | | | |
|---|---|---|---|---|---|
| Charge | | | Discharge | | |
| C Rate | Rest (minute) | V/Li metal (V) | C Rate | Rest (minute) | V/Li metal (V) |
| 0.10 | 30 | 4.3 | 0.10 | 30 | 3.0 |

1.4. Full Cell

1.4.1. Full Cells Preparation 200 mAh pouch-type cells are prepared as follows: the positive electrode active material powder, Super-P (Super-P, Timcal, (Imerys Graphite & Carbon), http://www.imerys-graphite-and-carbon.com/wordpress/wp-app/uploads/2018/10/ENSACO-150-210-240-250-260-350-360-G-ENSACO-150-250-P-SUPER-P-SUPER-P-Li-C-NERGY-SUPER-C-45-65-T_V-2.2_-USA-SDS.pdf), graphite (KS-6, Timrex (Imerys Graphite & Carbon), http://www.imerys-graphite-and-carbon.com/wordpress/wp-app/uploads/2014/04/Powder-Metallurgy.pdf) as positive electrode conductive agents and polyvinylidene fluoride (PVDF 1710, Kureha, https://www.kureha.co.jp/en/business/material/pdf/KFpolymer_B-D_en.pdf) as a positive electrode binder are added to N-methyl-2-pyrrolidone (NMP) as a dispersion medium so that the mass ratio of the positive electrode active material powder, the positive electrode conductive agents: super P and graphite, and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15 μm thick aluminium foil. The width of the applied area is 26 mm and the length is 190 mm. Typical loading weight of a positive electrode active material is about 11±1 mg/cm$^2$. The electrode is then dried and calendared using a pressure of 120 Kgf. In addition, an aluminium plate serving as a positive electrode current collector tab is arc-welded to an end portion of the positive electrode.

Commercially available negative electrodes are used. In short, a mixture of artificial graphite, carboxy-methyl-cellulose-sodium (CMC), and styrene-butadiene-rubber (SBR), in a mass ratio of 96/2/2, is applied on both sides of a copper foil. A nickel plate serving as a negative electrode current collector tab is arc-welded to an end portion of the negative electrode. Typical loading weight of a negative electrode active material is about 9±1 mg/cm$^2$. Non-aqueous electrolyte is obtained by dissolving lithium hexafluorophosphate (LiPF$_6$) salt at a concentration of 1.2 mol/L in a mixed solvent of ethylene carbonate (EC), dimethyl carbonate (DMC), and ethyl methyl carbonate (EMC) in a volume ratio of 1:1:1. It contains 0.5 wt. % lithium bis(oxalate)borate (LiBOB), 0.5 wt. % 1,3-propane sultone (PRS), and 1.0 wt. % vinylene carbonate (VC) as additives.

A sheet of the positive electrode, a sheet of the negative electrode, and a sheet of the microporous polymer separator (22 μm) interposed between them are spirally wound using a winding core rod in order to obtain a spirally wound electrode assembly. The assembly and the electrolyte are then put in an aluminium laminated pouch in an air-dry room with dew point of −50° C., so that a flat pouch-type lithium rechargeable battery is prepared. The design capacity of the rechargeable battery is 200 mAh when charged to 4.20 V. The full cell testing procedure uses a 1 C current definition of 200 mA/g.

1.4.2. Testing Method

A. Pre-Charging and Formation

The non-aqueous electrolyte solution is impregnated into the prepared dry battery for 8 hours at room temperature. The battery is pre-charged with the current of 0.25 C until 15% of its theoretical capacity and aged for a day at room temperature. The battery is then degassed using a pressure of −760 mmHg for 30 seconds, and the aluminium pouch is sealed.

The battery is charged with a current of 0.25 C in CC mode (constant current) up to 4.2 V or 4.3 V and CV mode (constant voltage) until a cut-off current of C/120 is reached. The battery is discharged with a current of 0.50 C in CC mode down to 2.7V. Then, it is fully charged with a current of 0.50 C in CC mode up to 4.2 V or 4.3 V and CV mode until a cut off current of C/20 is reached. The charged battery is aged for a week. The aged battery is ready for the final charging step and the cycling step.

B. Final Charging

The aged battery, after pre-charging and formation step, is discharged with a current of 0.50 C in CC mode down to 2.7 V. It is again charged with a current of 1.0 C in CC mode up to 4.2 V or 4.3 V and CV mode until a cut-off current of C/20 is reached. Then, the battery is discharged with a current of 0.2 C in CC mode down to 2.7 V. The discharge capacity obtained in this discharging step is defined as the specific capacity (SQ) of the battery. The battery is charged with a current of 1.0 C in CC mode up to 4.2 V or 4.3 V. The final charging step is done in 25° C.

C. Cycle Life Test

The lithium rechargeable full cell batteries are charged and discharged continuously under the following conditions, both at 25° C., to determine their charge-discharge cycle performance:

Charge is performed in CC mode under 1 C rate up to 4.2 V, then CV mode until C/20 is reached, The cell is then set to rest for 10 min, Discharge is done in CC mode at 1 C rate down to 2.7 V, The cell is then set to rest for 10 min, The charge-discharge cycles proceed until 800 or 1000 cycles. Every 100 cycles, the discharge is done at 0.2 C rate in CC mode down to 2.7 V.

The retained capacity at the nth cycle is calculated as the ratio of the discharge capacity obtained at cycle n to cycle 1.

1.5. X-Ray Diffraction

The X-ray diffraction pattern of the positive electrode active material is collected with a Rigaku X-Ray Diffracto-meter D/max2000 (Rigaku, Du, Y., et al. (2012). A general method for the large-scale synthesis of uniform ultrathin metal sulphide nanocrystals. Nature Communications, 3(1)) using a Cu Kα radiation source (40 kV, 40 mA) emitting at a wavelength of 1.5418 Å. The instrument configuration is set at: a 1° Soller slit (SS), a 10 mm divergent height limiting slit (DHLS), a 1° divergence slit (DS) and a 0.3 mm reception slit (RS). The diameter of the goniometer is 185 mm. For the XRD, diffraction patterns are obtained in the range of 15-65° (2θ) with a scan speed of 1° per min and a step-size of 0.02° per scan.

1.6. X-Ray Photoelectron Spectroscopy

In the present invention, X-ray photoelectron spectros-copy (XPS) is used to analyse the surface of positive electrode active material powder particles. In XPS measure-ment, the signal is acquired from the first few nanometres (e.g. 1 nm to 10 nm) of the sample surface layer. Therefore, all elements measured by XPS are contained in the surface layer.

For the surface analysis of positive electrode active mate-rial powder particles, XPS measurement is carried out using a Thermo K-α+spectrometer (Thermo Scientific, https://www.thermofisher.com/order/catalog/product/IQLAAD-GAAFFACVMAHV). Monochromatic Al Kα radiation (hu=1486.6 eV) is used with a spot size of 400 μm and measurement angle of 45°. A wide survey scan to identify elements present at the surface is conducted at 200 eV pass energy. C1s peak having a maximum intensity (or centred) at a binding energy of 284.8 eV is used as a calibrate peak position after data collection. Accurate narrow scans are performed afterwards at 50 eV for at least 10 scans for each identified element to obtain a high signal to noise ratio.

Curve fitting is done with CasaXPS Version 2.3.19PR1.0 (Casa Software, http://www.casaxps.com/) using a Shirley-type background treatment and Scofield sensitivity factors. The fitting parameters are according to Table 2a. Line shape GL(30) is the Gaussian/Lorentzian product formula with 70% Gaussian line and 30% Lorentzian line. LA(α, β, m) is an asymmetric line-shape where α and β define tail spread-ing of the peak and m define the width.

TABLE 2a

| | XPS fitting parameter for Ni2p3, Mn2p3, Co2p1, and W4f7. | | | |
|---|---|---|---|---|
| Ele-ment | Sensitivity factor | Fitting range (eV) | Defined peak(s) | Line shape |
| Ni | 14.61 | 850.0 ± 0.1-869.0 ± 0.1 | Ni2p3, Ni2p3 satellite | LA(1.33, 2.44, 69) |
| Mn | 9.17 | 639.9 ± 0.1-649.5 ± 0.1 | Mn2p3, Mn2p3 satellite | GL(30) |
| Co | 6.54 | 792.5 ± 0.1-808.0 ± 0.1 | Co2p1, Co2p1 satellite | GL(30) |
| W | 9.80 | 32.0 ± 0.1-43.0 ± 0.1 | W4f7, W4f5, W5p3 | GL(30) |

For Mn, Co, and W peaks, constraints are set for each defined peak according to Table 2b. W atomic ratio is quantified from W4f7 and W4f5 peaks hence W5p3 is not quantified.

TABLE 2b

| | XPS fitting constraints for Mn, Co, and W peaks fitting. | | | |
|---|---|---|---|---|
| Element | Defined peak | Fitting range (eV) | FWHM (eV) | Area |
| Mn | Mn2p3 | 640.0-645.0 | 0.5-4.0 | No constraint set |
| | Mn2p3 satellite | 645.0-648.0 | 0.5-4.0 | 40% of Mn2p3 area |

TABLE 2b-continued

| | | XPS fitting constraints for Mn, Co, and W peaks fitting. | | |
|---|---|---|---|---|
| Element | Defined peak | Fitting range (eV) | FWHM (eV) | Area |
| Co | Co2p1-1 | 794.0-799.0 | 0.5-4.0 | No constraint set |
| | Co2p1-2 | 794.0-799.0 | 0.5-4.0 | No constraint set |
| | Co2p1 satellite | 801.0-808.0 | 0.5-5.0 | No constraint set |
| W | W4f7 | 33.0-36.0 | 0.2-4.0 | No constraint set |
| | W4f5 | 36.1-39.0 | Same as W4f7 | 75% of W4f7 area |
| | W5p3 | 39.1-43.0 | 0.5-2.5 | No constraint set |

The Co surface content is expressed by the atomic content of Co in the surface layer of the particles divided by the total atomic content of Ni, Mn and Co in said surface layer.

1.7. Transmission Electron Microscopy Energy-Dispersive X-Ray Spectroscopy

To examine the Ni, Mn, Co, and W distribution within the positive electrode active material powder particle, cross-sectional TEM lamellas of particles are prepared by a Helios Nanolab 450hpDual Beam Scanning Electron Microscope-Focused Ion Beam (SEM-FIB) (ThermoFisher Scientific, https://www.fei.com/25-years-of-dualbeam-innovation/?utm_source=blog&utm_medium=blog&utm_campaign=25th+DualBeam+blog&utm_content=blog). Ga ion beam is used with 30 kV voltage and 30 pA-7 nA current. The etched sample has a dimension of 5×8 μm with 100 nm thickness. Using the prepared sample, the surface property from the surface to the center of the positive electrode active material powder particle is analyzed by TEM and energy-dispersive X-ray spectroscopy (EDS). The TEM-EDS line scan is performed on JEM-2100F (JEOL, https://www.jeol.co.jp/en/products/detail/JEM-2100F.html) with X-Max$^N$ 80T (from Oxford Instruments, https://nano.oxinst.com/products/x-max/x-max). An EDS analysis of the particle provides the quantitative element analysis of the cross-section.

The measured line profile as a function of a linear distance in a cross section of a particle is smoothed by the Savitzhky-Golay filter with the points of 10 using Origin 9.1 software so as to mitigate intrinsic analytical error of EDS.

Figure 3:
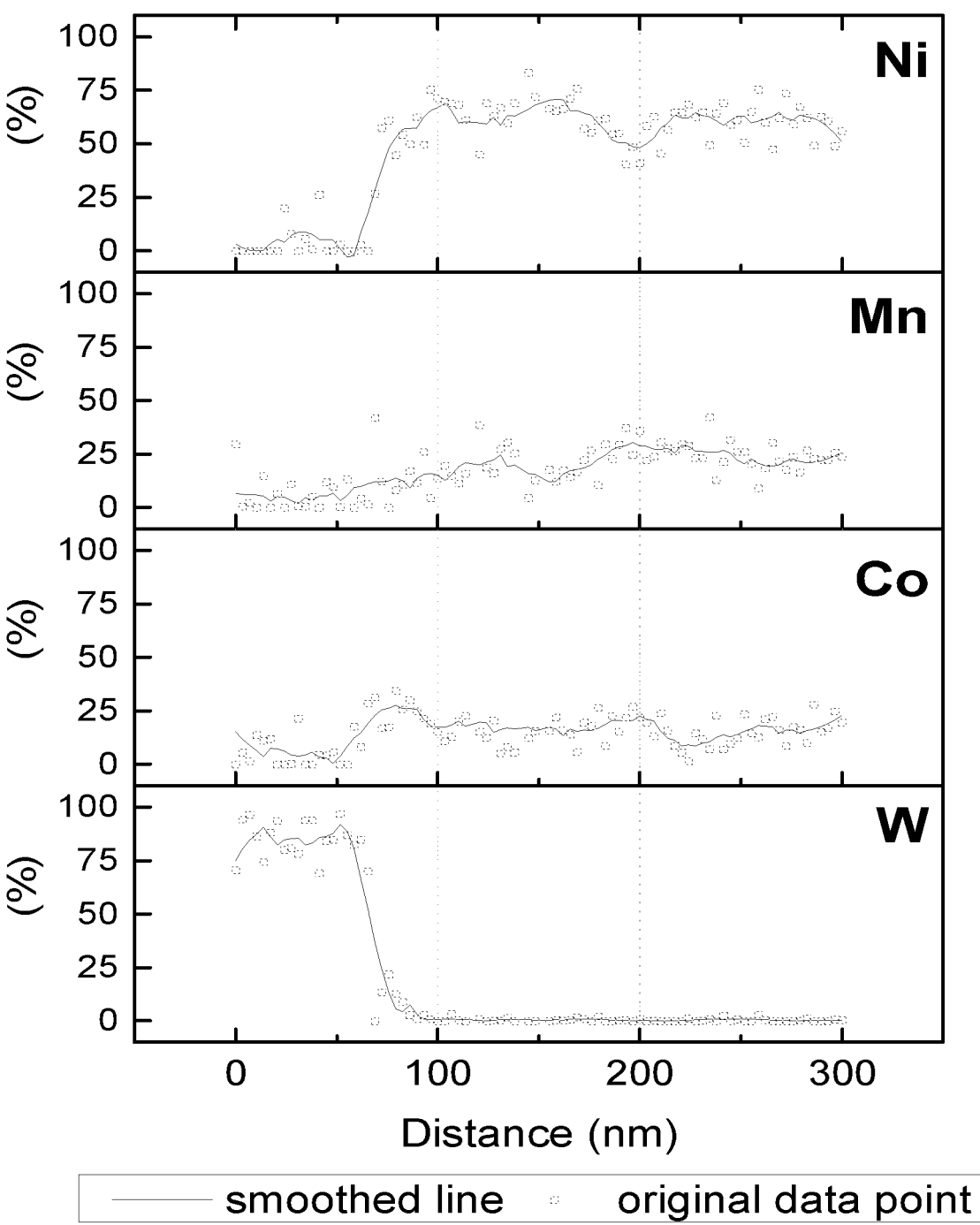
FIG. 3 shows the TEM/EDS line profiling for the cross-section of EX1.1 prepared by SEM-FIB.

TEM-EDS line profiling analysis of all elements, expressed in atomic % relative to the total amount of Ni, Mn, Co, B, Mg, Al, Nb, Ti, W and Zr, such as exemplified in FIG. 3.

1.8. Particle Size Distribution

The particle size distribution (PSD) of the positive electrode active material powder is measured by using a Malvern Mastersizer 3000 with a Hydro MV wet dispersion accessory (https://www.malvernpanalytical.com/en/products/product-range/mastersizer-range/mastersizer-3000#overview) after having dispersed each of the powder samples in an aqueous medium. In order to improve the dispersion of the powder, sufficient ultrasonic irradiation and stirring is applied, and an appropriate surfactant is introduced. D50 is defined as the particle size at 50% of the cumulative volume % distributions obtained from the Malvern Mastersizer 3000 with Hydro MV measurements.

1.9. Polymer Cell Test

1.9.1. Polymer Cell Preparation

1.9.1.1. Solid Polymer Electrolyte (SPE) Preparation

Solid polymer electrolyte (SPE) is prepared according to the process as follows:

Step 1) Mixing polyethylene oxide (PEO having a molecular weight of 1,000,000, Alfa Aesar https://www.alfa.co.kr/AlfaAesarApp/faces/adf.taskflow?adf.tfId=ProductDetailsTF&adf.tfDoc=/WEB-INF/ProductDetailsTF.xml&ProductId=043678&_afrLoop=1010520209597576&_afrWindowMode=0&_afrWindowId=null) with Lithium bis(trifluoromethanesulfonyl)imide salt (LiTFSI, Soulbrain Co., Ltd.) in acetonitrile anhydrous 99.8 wt. % (Aldrich https://www.sigmaaldrich.com/catalog/product/sial/271004?lang=ko&region=KR&gclid=EAIaIQobChMIwcrBOdlDL6AIVBbeWCh0ieAXREAAYASAAEgJCa__D_BwE), using a mixer for 30 minutes at 2000 revolutions per minute (rpm). The molar ratio of ethylene oxide to lithium is 20.

Step 2) Pouring the mixture from Step 1) into a Teflon dish and dried in 25° C. for 12 hours.

Step 3) Detaching the dried SPE from the dish and punching the dried SPE in order to obtain SPE disks having a thickness of 300 μm and a diameter of 19 mm.

1.9.1.2. Catholyte Electrode Preparation

Catholyte electrode is prepared according to the process as follows:

Step 1) Preparing a polymer electrolyte mixture comprising polycaprolactone (PCL having a molecular weight of 80,000, Sigma-Aldrich https://www.sigmaa/drich.com/catalog/product/a/drich/440744) solution in anisole anhydrous 99.7 wt. % (Sigma-Aldrich, https://www.sigmaaldrich.com/catalog/product/sial/296295) and bis(trifluoromethanesulfonyl)imide salt (LiTFSI, Sigma-Aldrich, https://www.sigmaaldrich.com/catalog/product/aldrich/544094) in acetonitrile. The mixture has a ratio of PCL:LiTFSI of 74:26 by weight.

Step 2) Mixing a polymer electrolyte mixture prepared from Step 1), a positive electrode active material, and a conductor powder (Super P, Timcal (Imerys Graphite & Carbon), http://www.imerys-graphite-and-carbon.com/wordpress/wp-app/uploads/2018/10/ENSACO-150-210-240-250-260-350-360-G-ENSACO-150-250-P-SUPER-P-SUPER-P-Li-C-NERGY-SUPER-C-45-65-T_V-2.2_-USA-SDS.pdf) in acetonitrile solution with a ratio of 21:75:4 by weight so as to prepare a slurry mixture. The mixing is performed by a homogenizer for 45 minutes at 5000 rpm.

Step 3) Casting the slurry mixture from Step 2) on one side of an 20 μm-thick aluminum foil with 100 μm coater gap.

Step 4) Drying the slurry-casted foil at 30° C. for 12 hours followed by punching in order to obtain catholyte electrodes having a diameter of 14 mm.

1.9.1.3. Polymer Cell Assembling

The coin-type polymer cell is assembled in an argon-filled glovebox with an order from bottom to top: a 2032 coin cell can, a catholyte electrode prepared from section 1.2.1.2, a SPE prepared from section 1.2.1.1, a gasket, a Li anode, a spacer, a wave spring, and a cell cap. Then, the coin cell is completely sealed to prevent leakage of the electrolyte.

1.9.2. Testing Method

Each coin-type polymer cell is cycled at 80° C. using a Toscat-3100 computer-controlled galvanostatic cycling stations (from Toyo, http://www.toyosystem.com/image/menu3/toscat/TOSCAT-3100.pdf). The coin cell testing procedure uses a 1C current definition of 160 mA/g in the 4.4-3.0 V/Li metal window range according to the schedule below:

Step 1) Charging in a constant current mode with C-rate of 0.05 with an end condition of 4.4 V followed by 10 minutes rest.

Step 2) Discharging in a constant current mode with C-rate of 0.05 with an end condition of 3.0 V followed by 10 minutes rest.

Step 3) Charging in a constant current mode with C-rate of 0.05 with an end condition of 4.4 V, Step 4) Switching to a constant voltage mode and keeping 4.4 V for 60 hours.

Step 5) Discharging in a constant current mode with C-rate of 0.05 with an end condition of 3.0 V.

$Q_{total}$ is defined as the total leaked capacity at the high voltage and high temperature in step 4 according to the described testing method. A low value of $Q_{total}$ indicates a high stability of the positive electrode active material powder during a high temperature operation.

2. Examples and Comparative Examples

Comparative Example 1

A single-crystal positive electrode active material labelled as CEX1 having a general formula $Li_{1.01}(Ni_{0.63}Mn_{0.22}Co_{0.15})_{0.99}O_2$ is obtained through a solid-state reaction between a lithium source and a nickel-based transition metal source. The process is running as follows:

Step 1) Transition metal hydroxide precursor preparation: A nickel-based transition metal hydroxide powder (TMH1) having a metal composition of $Ni_{0.63}Mn_{0.22}Co_{0.15}$ and a median particle diameter (D50) of 5.8 μm is prepared by a co-precipitation process in a large-scale continuous stirred tank reactor (CSTR) with mixed nickel manganese cobalt sulfates, sodium hydroxide, and ammonia.

Step 2) First mixing: the TMH1 prepared from Step 1) is mixed with $Li_2CO_3$ in an industrial blender so as to obtain a first mixture having a lithium to metal (Li/Me) ratio of 0.85.

Step 3) First firing: The first mixture from Step 2) is fired at 900° C. for 10.3 hours in dry air atmosphere so as to obtain a first intermediate product which is a first fired cake.

Step 4) Second mixing: the first intermediate product from Step 3) is mixed with LiOH in an industrial blender so as to obtain a second mixture having a lithium to metal (Li/Me) ratio of 1.050.

Step 5) Second firing: the second mixture from Step 4) is fired at 950° C. for 10.25 hours in dry air, followed by wet bead milling, drying, and sieving process so as to obtain a second intermediate product, which is a second fired powder.

Step 6) Third mixing: the second intermediate product from Step 5) is mixed in an industrial blender with 1.5 mol % of LiOH with respect to the total molar contents of Ni, Mn, and Co in the second intermediate product so as to obtain a third mixture.

Step 7) Third firing: the third mixture from Step 6) is fired at 750° C. for 10 hours in dry air so as to produce CEX1 having Li/Me ratio of 1.02.

It is believed that especially the wet bead milling is responsible for obtaining a single-crystalline morphology.

Example 1

A single-crystalline positive electrode active material EX1.1 is prepared according to the following process:

Step 1) Slurry preparation: 100 grams of deionized water is placed in a beaker on a hot plate. When the temperature of the deionized water is 60° C., 100 grams of CEX1 is added into the deionized water so as to prepare a first slurry.

Step 2) Cation and anion precursor addition: The first slurry is stirred by a magnetic stirrer with 600 rpm. After the first slurry reaches a stable temperature of 60° C., 0.5 mol % of cation precursor $CoSO_4$ and 0.5 mol % of anion precursor $Na_2WO_4$ solutions with respect to the total molar contents of Ni, Mn, and Co of CEX1 are injected into the beaker so as to prepare a second slurry. The second slurry is continuously stirred for 10 minutes.

Step 3) Filtering and drying: After 10 minutes, the coated lithium transition metal oxide particulate, which is a powder, is separated from the liquid by filtering. The isolated particulate is rinsed with 50 mL of deionized water and dried.

Step 4) Heating: The dried and isolated particulate is subsequently heated at 375° C. under dry air atmosphere for 10 hours and labelled as EX1.1.

EX1.2 is prepared according to the same method as EX1 except that the amount of cation and anion precursor added in step 2 are 1.0 mol % each.

EX1.3 is prepared according to the same method as EX1 except that the heating temperature is 450° C. instead of 375° C.

Example 2

EX2.1 is prepared according to the same method as EX1.1 except that the cation and anion precursor added in step 2 are $MnSO_4$ and $Na_2WO_4$, respectively.

Comparative Example 2

CEX1 is heated at 375° C. under dry air atmosphere for 10 hours. 100 grams of the resulting product is mixed with 100 grams of deionized water at a temperature of 60° C., so as to prepare a first slurry. The first slurry is stirred by a magnetic stirrer with a rpm (rotation per minute) of 600 for 10 minutes. After 10 minutes, the powder is separated from the liquid by a filtering. The separate powder is dried. The dried powder is final heated at 375° C. under dry air atmosphere for 10 hours and labelled as CEX2.1.

CEX2.2 is prepared according to the same method as EX2.1 except that the heating temperature in step 4 is 250° C.

Example 3

EX3.1 is prepared according to the same method as EX1.1 except that the anionic compound added in step 2 is $NaAlO_2$.

EX3.2 is prepared according to the same method as EX3.1 except that the heating temperature in step 4 is 750° C.

Example 4 to 8

EX4-EX8 are prepared according to the same method as EX1.1 except that the cation and anion precursor added in step 2 are according to Table 3.

Comparative Example 3 and 4

CEX3 and CEX4 are prepared according to the same method as EX1.1 except that the cation and anion precursor added in step 2 are according to Table 3.

EX1-EX8 and CEX2-CEX4 have Li/Me ratio of around 1.01.

TABLE 3

Summary of the cation and anion precursors applied
in the method and the electrochemical properties
of example and comparative examples.

| ID | cation precursor | anion precursor | molar content* (mol %) | temper- ature** (° C.) | $Q_{total}$ (mAh/g) |
|---|---|---|---|---|---|
| CEX1 | —*** | — | — | — | 60.03 |
| EX1.1 | $CoSO_4$ | $Na_2WO_4$ | 0.5 | 375 | 45.94 |
| EX1.2 | $CoSO_4$ | $Na_2WO_4$ | 1.0 | 375 | 31.40 |
| EX2.1 | $MnSO_4$ | $Na_2WO_4$ | 0.5 | 375 | 43.86 |
| CEX2.2 | $MnSO_4$ | $Na_2WO_4$ | 0.5 | 250 | 62.87 |
| EX3.1 | $CoSO_4$ | $NaAlO_2$ | 0.5 | 375 | 31.92 |
| EX3.2 | $CoSO_4$ | $NaAlO_2$ | 0.5 | 750 | 37.93 |
| EX4 | $Al_2(SO4)_3$ | $Na_2WO_4$ | 0.5 | 375 | 36.14 |
| EX5 | $ZnSO_4$ | $Na_2WO_4$ | 0.5 | 375 | 37.82 |
| EX6 | $CuNO_3$ | $Na_2WO_4$ | 0.5 | 375 | 46.25 |
| EX7 | $La(NO_3)_3$ | $NaAlO_2$ | 0.5 | 375 | 48.32 |
| EX8 | $CoSO_4$ | $Na_2SiO_3$ | 0.5 | 375 | 38.67 |
| CEX3 | $Ca(NO_3)_2$ | $Na_2WO_4$ | 0.5 | 375 | 70.30 |
| CEX4 | $CoSO_4$ | $Na_2MoO_4$ | 0.5 | 375 | 65.16 |

*molar content of each compound added in step 2 according to the EX1.1 preparation.
**heating temperature applied in step 4 according to the EX1.1 preparation.
***not applicable.

FIG. 1A shows the SEM image of CEX1 having a single-crystalline morphology.

Figure 1B:
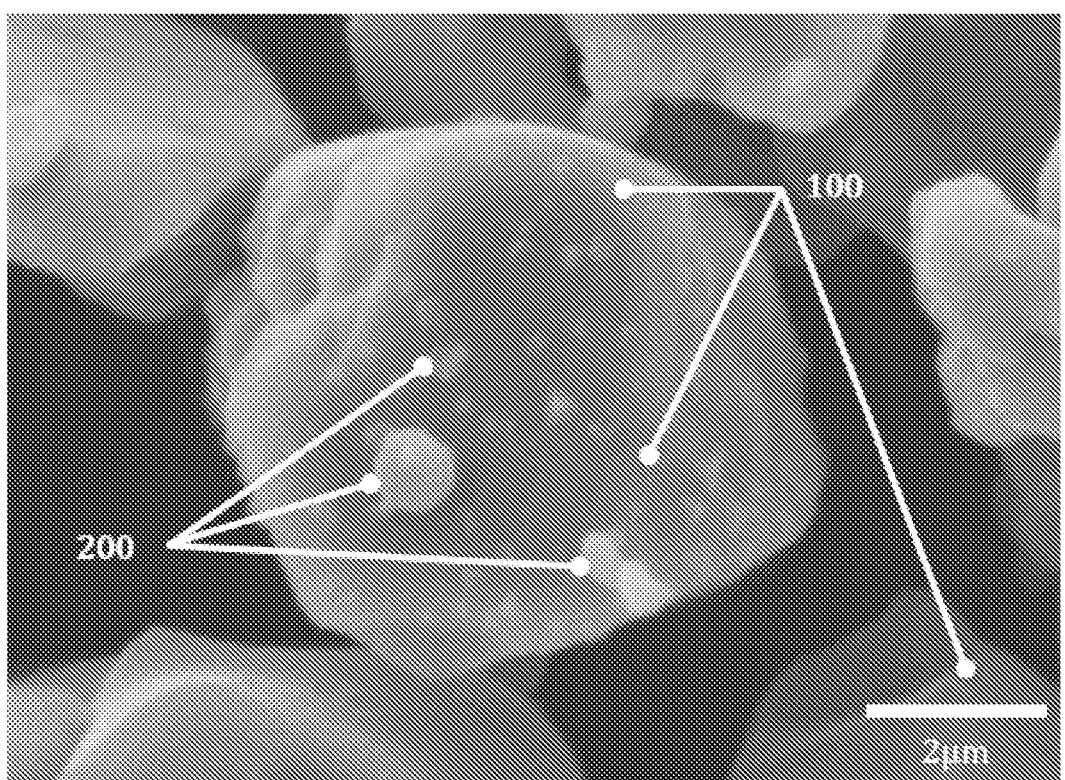
FIG. 1B depicts a SEM image of the same material onto which $Li_6W_2O_9$ is deposited positive electrode active material obtained by the method according to the invention.

FIG. 1B shows the SEM image of EX1.1. On the surface of the larger particles small particles are present, which are absent in CEX1. It can be easily seen that EX1.1 is single-crystalline. The areas designated 100 represent an outer layer which is rich in Co. The secondary particles designated 200 are considered to be mainly formed by the phase $Li_6W_2O_9$ as indicated by XRD analysis in FIG. 2.

Figure 2:
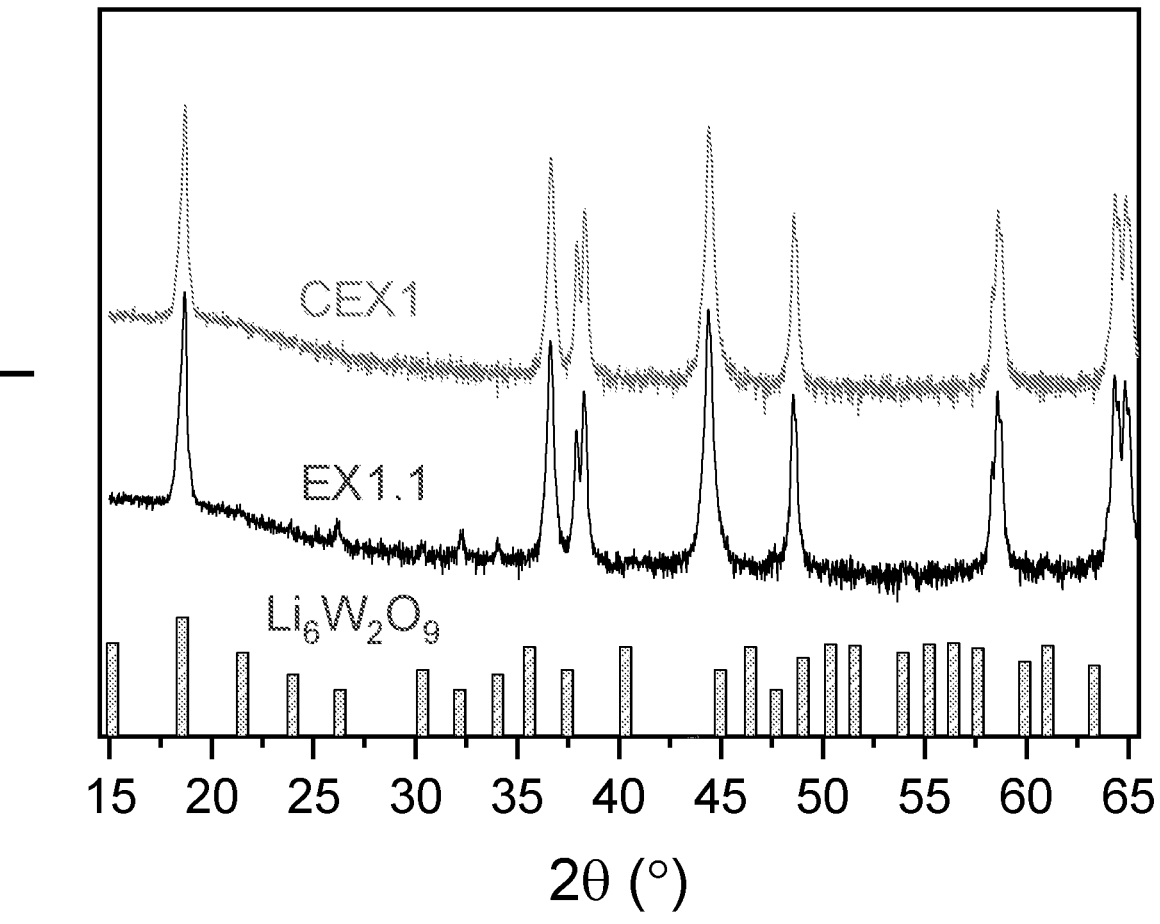
FIG. 2 shows an X-ray diffractogram of EX1.1, CEX1, and $Li_6W_2O_9$ secondary phase.

FIG. 2 shows the X-ray diffraction patterns of CEX1 and EX1.1. Two phases are identified in EX1.1 diffractogram, namely R-3m phase corresponds to $Li_{1+a}$ $(Ni_{0.63}Mn_{0.22}Co_{0.15})_{1-a}O_2$ and Pm3m phase corresponds to $Li_6W_2O_9$. Said $Li_6W_2O_9$ is formed in the process for producing positive electrode active material according to this invention. The presence of Pm3m phase in XRD, for instance, is indicated by the diffraction peaks at 2θ of 23.8±0.1°, 26.2±0.1°, 30.3±0.1°, and 32.2±0.1°.

In the XRD results of the comparative example CEX1, the phase $Li_6W_2O_9$ is not observed.

Table 3 summarizes the method parameters and the obtained $Q_{total}$ of the positive electrode active material. It is observed that EX1 has a lower $Q_{total}$ of 45 mAh/g in comparison with the bare CEX1 with a $Q_{total}$ of 60.03 mAh/g. Similarly, EX1.2 has a $Q_{total}$ of 31.40 mAh/g.

Treatment in a slurry of $MnSO_4$ and $Na_2WO_4$ and heating the coated particulate to a temperature at 250° C. provides a cathode active material having a $Q_{total}$ of 62.87 mAh/g as shown in CEX2.2. Heat treatment at a temperature above 300° C., such as at 375° C. in EX2.1 shows a significantly reduced $Q_{total}$, i.e. $Q_{total}$ of 43.86 mAh/g, a comparable value with that of EX1.1.

EX3.1 and EX3.2 introduce $CoSO_4$ and $NaAlO_2$ as the cation and anion precursor, respectively, with a different heating temperature. EX3.1 heated at 375° C. shows $Q_{total}$ of 31.92 mAh/g while EX3.2 heated at 750° C. shows $Q_{total}$ of 37.93 mAh/g. It can be concluded that both temperature conditions are suitable in the present method.

Other pairs of cation and anion precursor are applied in EX4 to EX8, CEX3, and CEX4 as listed in Table 3. The result in table 3 demonstrate that the positive electrode active material produced in a method according to the invention has a better stability in the high temperature and high voltage application.

A possible mechanism is the reaction of the anion and cation precursor generating a protective layer to prevent metal dissolution process from the positive electrode active material in the high temperature and high voltage application.

A particle size distribution was determined of the EX1.1 and EX1.3. This showed that EX1.1 and EX1.3 had a median particle size D50 of 7 μm.

Coin cell tests were done with the CEX1, CEX2.1, EX1.1 and EX1.3 as explained above. Table 4 contains a summary of the relevant results.

TABLE 4

Overview of the chemical composition as measured
by ICP and XPS and results of coin cell tests

| ID | Molar content of element compared to total of Ni + Mn + Co, as measured by ICP | | | | Molar content of Co in %, relative to total of Ni + Mn + Co, as measured by XPS | Ratio $Co_{XPS}/$ $Co_{ICP}$ | Results of coin cell tests | |
|---|---|---|---|---|---|---|---|---|
| | Ni (%) | Mn (%) | Co (%) | W (%) | | | DQ1 [d] | IRRQ [e] |
| CEX1 | 62.2 | 22.4 | 15.5 | 0 | 11.6 | 0.75 | 172.2 | 15.1 |
| EX1.1 | 61.6 | 22.0 | 16.3 | 0.16 | 41.0 | 2.51 | 175.1 | 14.0 |
| EX1.3 | 61.6 | 22.0 | 16.3 | 0.16 | 35.0 | 2.32 | 173.5 | 14.8 |
| CEX2.1 | 62.2 | 22.4 | 15.5 | 0 | 11.8 | 0.76 | 168.7 | 16.0 |

The reaction of the surface treatment of EX1.1 is assumed to be according to an equation $COSO_{4(aq)}+Na_2$ $WO_{4(aq)} \rightarrow CoWO_{4(s)}+Na_2SO_{4(aq)}$, wherein the $CoWO_4$ is precipitated on the surface of positive electrode active material. The $Li_6W_2O_9$ secondary phase (200) according to the present invention as shown in FIG. 1B is achieved by the following heat treatment of the positive electrode active material comprising the $CoWO_4$ compound on the surface.

The ratio of $Co_{XPS}/Co_{ICP}$ above 1.00 demonstrates that the surface region of the particles is enriched with respect to cobalt in the examples.

There is believed to be a synergetic effect of the enrichment of Co in the surface of particles and the presence of the $Li_6W_2O_9$ secondary phase for the electrochemical property.

Figure 4:
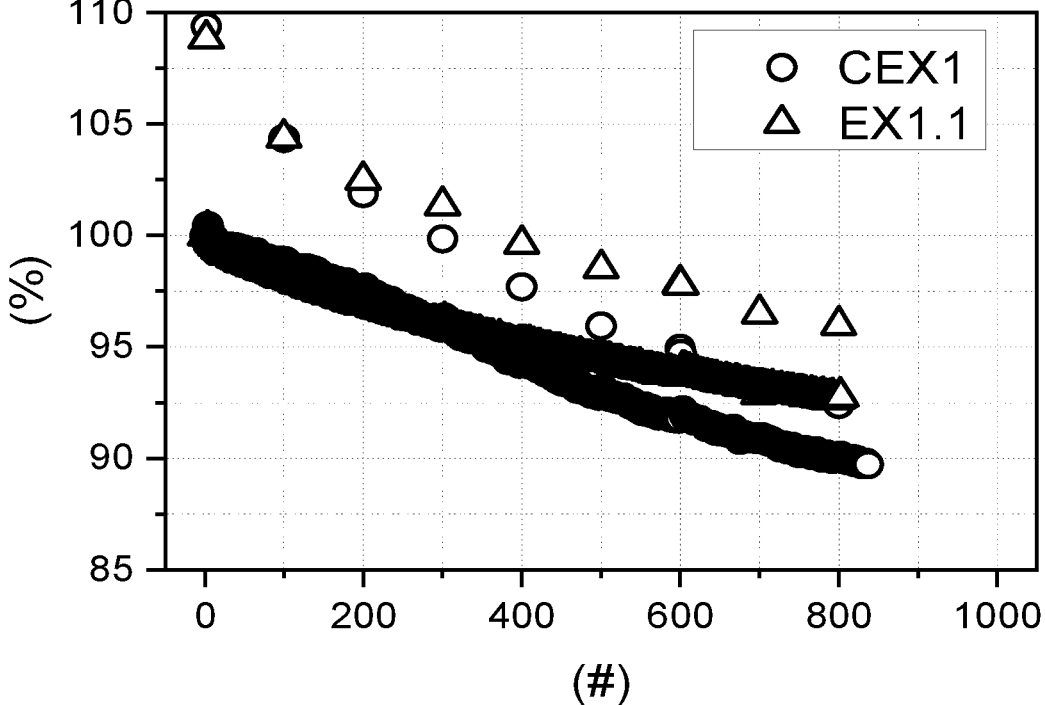
FIG. 4 shows the full cell cycle performance of EX1.1 and CEX1.

FIG. 4 shows the full cell cycle performance of EX1.1 and CEX1. The cycle life is defined as the number of charge-discharge cycles just before the discharge capacity degrades to or below 80% of the initial discharge capacity. The value of cycle life is obtained from extrapolation of the linear line equation. It is clear that EX1.1 has smaller gradient and reaches 80% of capacity after 2155 cycles. Cycle life of CEX1 is 1462 cycles, which is shorter than that of EX1.1. Full cell specific capacity (SQ) for EX1.1 and CEX1 are 167.1 mAh/g and 164.7 mAh/g, respectively, showing superiority of EX1.1 associated with the invention.

FIG. 3 shows the TEM-EDS line profiling for the cross-section of EX1.1 prepared by SEM-FIB. The dominant element in the outermost layer is tungsten which is from the $Li_6W_2O_9$ secondary phase (200) according to FIG. 1. The thickness of the secondary phase (200) is around 60 nm. The Co-rich layer having a thickness of around 50 nm is shown from the bottom of the secondary phase (200). It is important to note that the thickness can be varied according to the particle and site selections as well as the measurement direction.

The invention claimed is:

1. Method for manufacturing a positive electrode active material for solid-state rechargeable batteries comprising Li, O and M, wherein M consists of:

Co in a content x superior or equal to 0 mol % and inferior or equal to 35.00 mol %, Mn in a content y superior or equal to 0 mol % and inferior or equal to 35.00 mol %, A in a content z superior or equal to 0 mol % and inferior or equal to 10.00 mol %, whereby A is at least one element selected from: B, Mg, Al, Nb, Ti, W, Y, Ca, S, P, Sn, Si and Zr, and Ni in a content of 100.00 mol %-x-y-z, whereby the contents x, y, and z are contents relative to M and are as determined by ICP, whereby the method comprises the following steps:

Step 1: preparing a slurry, whereby the slurry comprises a liquid and a lithium mixed metal oxide powder, whereby the lithium mixed metal oxide powder comprises Li, O and Q, wherein Q consists of:

Co in a content a superior or equal to 0 mol % and inferior or equal to 35.00 mol %, Mn in a content b superior or equal to 0 mol % and inferior or equal to 35.00 mol %, G in a content c superior or equal to 0 mol % and inferior or equal to 10.00 mol %, whereby G is at least one element selected from: B, Mg, Al, Nb, Ti, W, Y, Ca, S, P, Sn, Si and Zr and Ni in a content of 100.00 mol %-a-b-c, whereby the contents a, b, and c are contents relative to Q and are as determined by ICP, Step 2: mixing said lithium mixed metal oxide powder, before and/or after and/or during step 1, with a cation precursor comprising at least one cation selected from: $Al^{3+}$, $La^{3+}$, $Co^{2+}$, $Co^{3+}$, $Mn^{2+}$, $Mn^{3+}$, $Mn^{4+}$, $Mn^{6+}$, $Zn^{2+}$, $Cu^+$, $Cu^{2+}$, $Mg^{2+}$, and with an anion precursor comprising at least one anion having a general formula $A'_{y'}O_{z'}^{-x'}$, wherein A' is selected from: B, Al, Sn, Si, P, W, wherein $0.5 \leq x' \leq 4$, $0.5 \leq y' \leq 2$ and $1 \leq z' \leq 12$;

Step 3: filtering and optionally drying said slurry to obtain a wet or dry solid fraction, whereby step 3 is optional; and Step 4: heating the slurry resulting from steps 1 and 2 or the solid fraction resulting from step 3 at a temperature in the range of 300° C. to 1000° C.

2. Method according to claim 1, wherein a is superior or equal to 5.0 mol %.

3. Method according claim 1, whereby the lithium mixed metal oxide powder is a plurality of single-crystal particles.

4. Method according to claim 1, wherein the positive electrode active material has a Li/(Ni+Co+Mn) molar ratio superior or equal to 0.90 and inferior or equal to 1.10 and wherein the lithium mixed metal oxide powder has a Li/(Ni+Co+Mn) molar ratio superior or equal to 0.90 and inferior or equal to 1.10.

5. Method according to claim 1, whereby said liquid is water and whereby said cation precursor and said anion precursor are soluble in the liquid.

6. Method according to claim 1 whereby the positive electrode active material comprises a phase corresponding to a crystalline salt of a lithium ion and said anion, as determined by XRD.

7. Method according to claim 1, wherein A' is the element W.

8. Method according to claim 7, wherein the cation precursor comprises $Co^{2+}$ and/or $Co^3$.

9. Method according to claim 7, whereby the positive electrode active material comprises $Li_6W_2O_9$, as determined by XRD.

10. Method according to claim 1, whereby x≤15.00 mol % and y≤5.00 mol %, whereby A comprises Al, whereby M has content of Al of 1.00 mol % or more.

11. Method according to claim 1, whereby z≤5.00 mol % and 10.00 mol %≤y.

12. Method according to claim 1, whereby 15.00 mol %≤x≤30.00 mol % and 15.00 mol %≤y≤30.00 mol % and z≤3.00 mol %.

13. A positive electrode active material for rechargeable solid-state batteries, whereby the positive electrode active material is a powder, whereby the positive electrode active material has a Co content $Co_A$, a Ni content $Ni_A$, and a Mn content $Mn_A$, whereby $Co_A$, $Ni_A$ and $Mn_A$ are determined by ICP analysis, whereby $Co_A$, $Ni_A$ and $Mn_A$ are expressed as molar fractions, whereby the positive electrode active material has a value A which is defined as $Co_A/(Co_A + Ni_A + Mn_A)$, whereby the positive electrode active material, when measured by XPS analysis, shows an average Co fraction $CO_B$, an average Ni fraction $Ni_B$, and an average Mn fraction $Mn_B$, whereby $CO_B$, $Ni_B$ and $Mn_B$ are expressed as molar fractions, whereby the positive electrode active material has a value B which is defined as $Co_B/(Co_B + N_{iB} + Mn_B)$, whereby the positive electrode active material comprises a $Li_xW_yO_z$ phase as determined by XRD, whereby $1.0 \leq x \leq 8.0$, $1.0 \leq y \leq 5.0$, $3.0 \leq z \leq 10.0$, whereby the ratio B/A is at least 1.25.

14. Positive electrode material according to claim 13, wherein the positive electrode material is manufacturable by the method comprising the following steps:

Step 1: preparing a slurry, whereby the slurry comprises a liquid and a lithium mixed metal oxide powder, whereby the lithium mixed metal oxide powder comprises Li, O and Q, wherein Q consists of:

Co in a content a superior or equal to 0 mol % and inferior or equal to 35.00 mol %, Mn in a content b superior or equal to 0 mol % and inferior or equal to 35.00 mol %, G in a content c superior or equal to 0 mol % and inferior or equal to 10.00 mol %, whereby G is at least one element selected from: B, Mg, Al, Nb, Ti, W, Y, Ca, S, P, Sn, Si and Zr and Ni in a content of 100.00 mol %-a-b-c, whereby the contents a, b, and c are contents relative to Q and are as determined by ICP, Step 2: mixing said lithium mixed metal oxide powder, before and/or after and/or during step 1, with a cation precursor comprising at least one cation selected from: $Al^{3+}$, $La^{3+}$, $Co^{2+}$, $Co^{3+}$, $Mn^{2+}$, $Mn^{3+}$, $Mn^{4+}$, $Mn^{6+}$, $Zn^{2+}$, $Cu^+$, $Cu^{2+}$, $Mg^{2+}$, and with an anion precursor comprising at least one anion having a general formula $A'_y O_z^{-x'}$, wherein A' is selected from: B, Al, Sn, Si, P, W, wherein $0.5 \leq x' \leq 4$, $0.5 \leq y' \leq 2$ and $1 \leq z' \leq 12$:

Step 3: filtering and optionally drying said slurry to obtain a wet or dry solid fraction, whereby step 3 is optional; and Step 4: heating the slurry resulting from steps 1 and 2 or the solid fraction resulting from step 3 at a temperature in the range of 300° C. to 1000° C.

15. Positive electrode active material according to claim 13, whereby the positive electrode active material has a Li content $Li_A$ as determined by ICP and is expressed as molar fraction, whereby $Li_A/(Co_A+Ni_A+Mn_A)$ is at least 0.81 and at most 1.21.

16. Positive electrode active material according to claim 13, whereby $Ni_A/(Co_A+Ni_A+Mn_A)$ is at least 0.35.

17. Positive electrode active material according to claim 16, whereby $Co_A/(Co_A+Ni_A+Mn_A)$ is at least 0.02 and at most 0.40.

18. Positive electrode active material according to claim 13, whereby the powder is a plurality of particles, whereby said $Li_x W_y O_z$ phase is present on the surface of said particles as determined by XRD and TEM/EDS line profiling prepared by SEM-FIB.

19. Positive electrode active material according to claim 13, whereby the powder is a plurality of particles, whereby said $Li_x W_y O_z$ phase is present on the surface of said particles as secondary particles.

20. Positive electrode active material according to claim 13, whereby said $Li_x W_y O_z$ phase is $Li_6 W_2 O_9$ as determined by XRD.

21. Positive electrode active material according to claim 13, whereby the positive electrode active material has a W content which is at least 0.1 mol % of the sum of $Co_A$ and $Ni_A$ and $Mn_A$.

22. Positive electrode active material according to claim 13, whereby the positive electrode active material has a W content which is at most 2.0 mol % of the sum of $Co_A$ and $Ni_A$ and $Mn_A$.

23. Positive electrode active material according to claim 13, whereby the powder is a single-crystalline powder.

24. Positive electrode active material according to claim 13, whereby said powder has a particle size distribution as determined by laser diffraction, whereby said particle size distribution has a median particle size D50 which is at least 1.0 μm and at most 15 μm.

25. Positive electrode active material according to claim 13, whereby the positive electrode active material has a content $X_A$ of one or more elements X, whereby X is one or more of B, Mg, Al, Nb, Ti, and Zr, whereby $X_A$ is determined by ICP, whereby $X_A$ is expressed as molar fraction, whereby $Mn_A/(Co_A+Ni_A+Mn_A)$ is at least 0.10 and at most 0.60, whereby $Co_A/(Co_A+Ni_A+Mn_A)$ is at least 0.02 and at most 0.40, whereby $X_A/(Co_A+Ni_A+Mn_A)$ is at most 0.10 and is superior or equal to 0 whereby $Ni_A/(Co_A+Ni_A+Mn_A)$ is at most 0.88.

\*    \*    \*    \*    \*